(12) United States Patent
Ihm et al.

(10) Patent No.: US 9,253,791 B2
(45) Date of Patent: Feb. 2, 2016

(54) METHOD AND APPARATUS OF REFERENCE SIGNAL DROPPING

(71) Applicant: LG ELECTRONICS INC., Seoul (KR)

(72) Inventors: Bin Chul Ihm, Anyang-si (KR); Ki Tae Kim, Anyang-si (KR); Su Nam Kim, Anyang-si (KR); Ji Won Kang, Anyang-si (KR); Jin Young Chun, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 14/356,850

(22) PCT Filed: Nov. 7, 2012

(86) PCT No.: PCT/KR2012/009304
§ 371 (c)(1),
(2) Date: May 7, 2014

(87) PCT Pub. No.: WO2013/085150
PCT Pub. Date: Jun. 13, 2013

(65) Prior Publication Data
US 2015/0237642 A1    Aug. 20, 2015

Related U.S. Application Data

(60) Provisional application No. 61/568,654, filed on Dec. 9, 2011.

(51) Int. Cl.
*H04W 4/00* (2009.01)
*H04W 72/10* (2009.01)
*H04L 5/00* (2006.01)

(52) U.S. Cl.
CPC .............. *H04W 72/10* (2013.01); *H04L 5/0048* (2013.01)

(58) Field of Classification Search
CPC .............................. H04W 72/10; H04L 5/0048
USPC ......................................................... 370/331
See application file for complete search history.

(56) References Cited

U.S. PATENT DOCUMENTS

| | | | | |
|---|---|---|---|---|
| 2011/0170435 A1* | 7/2011 | Kim | ................... | H04L 5/0023 370/252 |
| 2012/0051451 A1* | 3/2012 | Kwon | ................... | H04L 5/0053 375/285 |

FOREIGN PATENT DOCUMENTS

WO    2010/128836 A2    11/2010

OTHER PUBLICATIONS

ZTE, "CSI-RS configurations for CoMP", R1-113762, 3GPP TSG RAN WG1 Meeting #67, Nov. 2011, 3 pages.

*Primary Examiner* — Sai-Ming Chan
(74) *Attorney, Agent, or Firm* — Lee, Hong, Degerman, Kang & Waimey

(57) ABSTRACT

The present invention provides a method for reference signal dropping and an apparatus for the method. A method for CSI-RS dropping comprises receiving first CSI-RS configuration information including sub-frame information which is transmission resource information of a first CSI-RS and through which the first CSI-RS information is transmitted and resource element information which contains the first CSI-RS; receiving second CSI-RS configuration information including sub-frame information which is transmission resource information of a second CSI-RS and through which the second CSI-RS is transmitted and resource element information which contains the second CSI-RS; and in case transmission resources of the first CSI-RS according to the first CSI-RS configuration and transmission resources of the second CSI-RS according to the second CSI-RS configuration overlap with each other, determining according to a priority order whether a CSI-RS received from the overlapping transmission resources corresponds to the first or the second CSI-RS.

12 Claims, 10 Drawing Sheets

METHOD AND APPARATUS OF REFERENCE SIGNAL DROPPING

CROSS-REFERENCE TO RELATED APPLICATIONS

This application is the National Stage filing under 35 U.S.C. 371 of International Application No. PCT/KR2012/009304, filed on Nov. 7, 2012, which claims the benefit of U.S. Provisional Application Ser. No. 61/568,654, filed on Dec. 9, 2011, the contents of which are all hereby incorporated by reference herein in their entirety.

TECHNICAL FIELD

The present invention relates to wireless communication and more specifically, a method and an apparatus for reference signal dropping.

BACKGROUND ART

Data transmission rate is rapidly growing these days. The high data transmission rate is mainly due to advent and wide deployment of machine-to-machine (M2M) communication and various types of devices requiring high data transmission rate such as smart phones, tablet PCs, and the like. To meet the high data transmission rate required, novel technologies are recently getting attention, including carrier aggregation technology, cognitive radio technology, and the like which utilize more frequency bands efficiently; and multiple antenna technology, multiple base station collaboration technology, and the like for increasing data capacity with limited frequency resources.

Also, the current trend for wireless communication networks is toward increasing density of nodes that can be accessed in the vicinity of the user' current location. Here, a node stands for an antenna or a group of antennas spaced apart by more than a predetermined distance from each other in a distributed antenna system (DAS); however, it can be used in a broader sense rather than limited to the above definition. In other words, a node may correspond to a pico-cell base station (PeNB), a home base station (HeNB), a remote radio head (RRH), a remote radio unit (RRU), a repeater, and so on. A wireless communication system incorporating high density of nodes can provide a lot higher system performance due to collaboration among the nodes. That is, compared with the case where each node operates as an independent base station (namely, a base station (BS), an advanced BS (ABS), a Node-B (NB), an eNode-B (eNB), an access point (AP), and so on) showing no collaboration between each other, if one control station manages transmission and reception of individual nodes and thus, the nodes operate as an antenna or a group of antennas in a cell, vastly superior performance can be achieved. In what follows, a wireless communication system incorporating a plurality of nodes is called a multiple node system.

A node can be defined not only for a group of antennas spaced apart at regular intervals but also for an arbitrary group of antennas regardless of intervals among the antennas. For example, a base station comprising cross polarized antennas can be regarded to consist of nodes of H-pol antennas and nodes of V-pol antennas.

In a multiple node system, different nodes may be used to transmit signals according to the respective user equipment types; at the same time, a plurality of nodes may be employed for the transmission. At this time, reference signals different from each other can be transmitted for each of the node types. In this case, a user equipment measures channel status between nodes by using a plurality of reference signals and channel status information can be obtained as feedback periodically or aperiodically.

SUMMARY OF INVENTION

Technical Problem

The present invention has been made in an effort to provide a method for dropping one reference signal when reference signals with different objectives from each other are transmitted at the same time.

Another objective of the present invention is to provide an apparatus carrying out a method for dropping one reference signal when reference signals with different objectives from each other are transmitted at the same time.

Technical Solution

To solve the technical problems above, the present invention provides a method for CSI-RS dropping according to one aspect of the present invention comprises receiving first CSI-RS configuration information including sub-frame information which is transmission resource information of a first CSI-RS and through which the first CSI-RS information is transmitted and resource element information which contains the first CSI-RS; receiving second CSI-RS configuration information including sub-frame information which is transmission resource information of a second CSI-RS and through which the second CSI-RS is transmitted and resource element information which contains the second CSI-RS; and in case transmission resources of the first CSI-RS according to the first CSI-RS configuration and transmission resources of the second CSI-RS according to the second CSI-RS configuration overlap with each other, determining according to a priority order whether a CSI-RS received from the overlapping transmission resources corresponds to the first or the second CSI-RS. In case transmission resources of the first CSI-RS according to the first CSI-RS configuration and transmission resources of the second CSI-RS according to the second CSI-RS configuration overlap with each other, the determining according to a priority order whether a CSI-RS received from the overlapping transmission resources corresponds to the first or the second CSI-RS comprises calculating a period at which the first CSI-RS is received based on the first CSI-RS transmission resource information and calculating a period at which the second CSI-RS is received based on the second CSI-RS transmission resource information; and determining based on the calculated period whether a CSI-RS received from the overlapping transmission resources corresponds to the first or the second CSI-RS. The determining based on the calculated period whether a CSI-RS received from the overlapping transmission resources corresponds to the first or the second CSI-RS comprises determining a CSI-RS received from the overlapping transmission resources as the first CSI-RS in case the period of the first CSI-RS is longer than that of the second CSI-RS; and determining a CSI-RS received from the overlapping transmission resources as the second CSI-RS in case the period of the second CSI-RS is longer than that of the first CSI-RS. In case transmission resources of the first CSI-RS according to configuration of the first CSI-RS and transmission resources of the second CSI-RS according to configuration of the second CSI-RS overlap with each other, determining according to a priority order whether a CSI-RS received from the overlapping transmission resources corresponds to the first or the second CSI-RS comprises deciding a use for which the first CSI-RS is received and utilized and a use for which the second CSI-RS is received and utilized; and based on the use for which the first CSI-RS is received and utilized and the use for which the second CSI-RS is received and utilized, determining whether a CSI-RS received from the overlapping transmission resources corresponds to the first or the second CSI-RS. The determining according to a priority order whether a CSI-RS received from the overlapping transmission resources corresponds to the first or the second CSI-RS in case transmission resources of the first CSI-RS according to the first CSI-RS configuration and transmission resources of the second CSI-RS according to the second CSI-RS configuration overlap with each other comprises an upper layer's receiving information for determining whether a CSI-RS received from the overlapping transmission resources corresponds to the first or the second CSI-RS; and based on information received by the upper layer, determining whether a received CSI-RS corresponds to the first or the second CSI-RS. The information received by the upper layer may be such information for determining whether a CSI-RS received from the overlapping transmission resources corresponds to the first or the second CSI-RS by the upper layer's deciding a CSI-RS between the first and the second CSI-RS needed for a network in the first place.

To solve the technical problems above, a user equipment according to one aspect of the present invention comprises a transceiver receiving first CSI-RS configuration information including sub-frame information which is transmission resource information of a first CSI-RS and through which the first CSI-RS information is transmitted and resource element information which contains the first CSI-RS and receiving second CSI-RS configuration information including sub-frame information which is transmission resource information of a second CSI-RS and through which the second CSI-RS is transmitted and resource element information which contains the second CSI-RS; and a processor, in case transmission resources of the first CSI-RS according to the first CSI-RS configuration and transmission resources of the second CSI-RS according to the second CSI-RS configuration overlap with each other, determining according to a priority order whether a CSI-RS received from the overlapping transmission resources corresponds to the first or the second CSI-RS.

The processor, in case period of the first CSI-RS is longer than that of the second CSI-RS, determines a CSI-RS received from the overlapping transmission resources as the first CSI-RS and in case period of the second CSI-RS is longer than that of the first CSI-RS, a CSI-RS received from the overlapping transmission resources as the second CSI-RS. The processor determines the use for which the first CSI-RS is received and utilized and the use for which the second CSI-RS is received and utilized; and based on the use for which the first CSI-RS is received and utilized and the use for which the second CSI-RS is received and utilized, determines whether a CSI-RS received from the overlapping transmission resources corresponds to the first or the second CSI-RS. The processor determines in a receiving upper layer whether a received CSI-RS corresponds to the first or the second CSI-RS based on information for determining whether a CSI-RS received from the overlapping transmission resources corresponds to the first or the second CSI-RS.

The information received by the upper layer may be such information for determining whether a CSI-RS received from the overlapping transmission resources corresponds to the first or the second CSI-RS by the upper layer's deciding a CSI-RS between the first and the second CSI-RS needed for a network in the first place.

Advantageous Effects

According to example embodiments of method and apparatus of reference signal dropping, user equipment can determine whether a CSI-RS received from the overlapping transmission resources corresponds to the first or the second CSI-RS according to a priority order in case transmission resources of the first CSI-RS according to the first CSI-RS configuration and transmission resources of the second CSI-RS according to the second CSI-RS configuration overlap with each other. Therefore, the CSI-RSs which is expected to allocate in the same resource element for different purposes can be used for one purpose according to the priority order.

DESCRIPTION OF DRAWINGS

The accompany drawings, which are included to provide a further understanding of this document and are incorporated on and constitute a part of this specification illustrate embodiments of this document and together with the description serve to explain the principles of this document.

MODE FOR INVENTION

The technology disclosed in this document can be used for various multiple access schemes, including CDMA (code division multiple access), FDMA (frequency division multiple access), TDMA (time division multiple access), OFDMA (orthogonal frequency division multiple access), SC-FDMA (single carrier-frequency division multiple access), and so on.

CDMA can be realized by using a radio technology such as UTRA (Universal Terrestrial Radio Access) or CDMA2000. TDMA can be realized by such radio technologies as GSM (Global System for Mobile communication), GPRS (General Packet Radio Service), and EDGE (Enhanced Data Rates for GSM Evolution). OFDMA can be realized by using such radio technologies as IEEE (Institute of Electrical and Electronics Engineers) 802.11 (Wi-Fi), IEEE 802.16 (WiMAX), IEEE 802.20, E-UTRA (Evolved UTRA), and so on. The 3GPP (3rd Generation Partnership Project) LTE (Long Term Evolution) is part of the E-UMTS (Evolved UMTS) which makes use of the E-UTRA, employing the OFDMA in downlink transmission while employing the SC-FDMA in uplink transmission. The LTE-A (Advanced) is an evolution of the LTE system.

Figure 1:
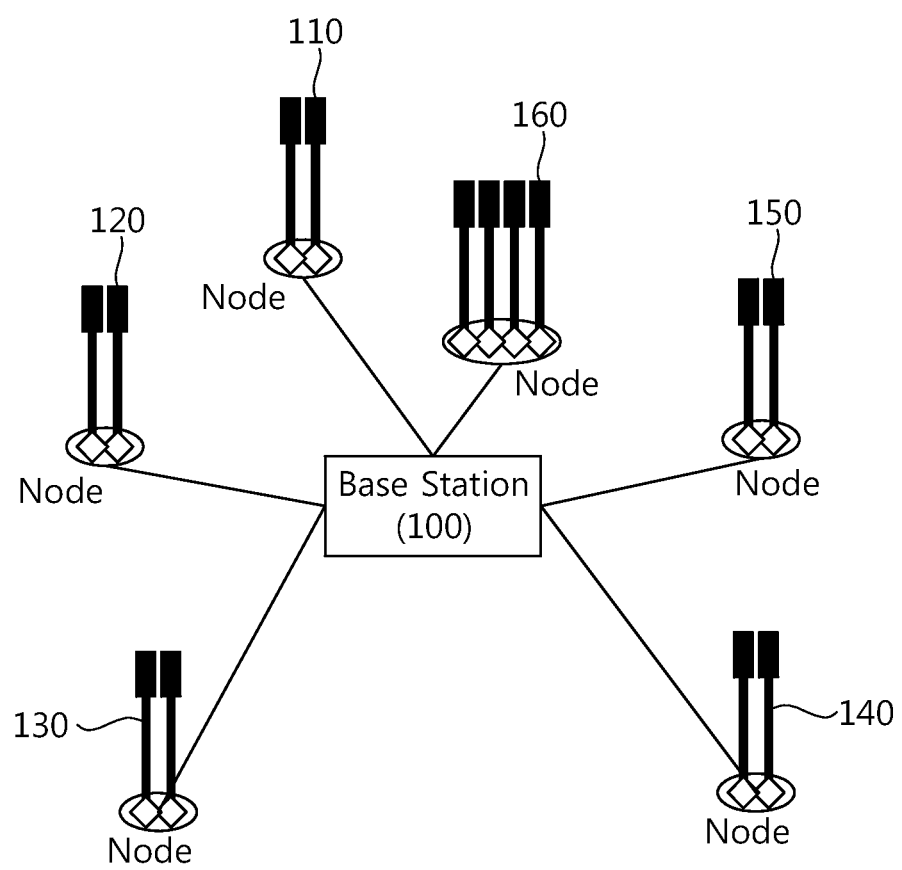
FIG. 1 illustrates a single cell, multiple distributed node system.

FIG. 1 illustrates a single cell, multiple distributed node system.

With respect to FIG. 1, in a single cell, multiple distributed node system, transmission and reception of the respective nodes 110, 120, 130, 140, 150, 160 is managed by a single, base station controller 100 and the nodes operate as if they are one part of a single cell.

In what follows, a node in an embodiment of the present invention typically refers to a group of antennas (where examples of physical implementation may include a remote radio head (RRH), a remote radio unit (RRU), and so on) spaced apart by more than a predetermined distance in a distributed antenna system (DAS). In this document, however, a node can be interpreted as a group of arbitrary type of antennas irrespective of physical spacing among them. For example, a base station comprising cross polarized antennas in an embodiment of the present invention may be regarded to consist of H-pol antenna nodes and V-pol antenna nodes. A node may correspond to a pico-cell base station (PeNB), a home base station (HeNB), and so on rather than a group of antennas.

Also, a 'node' in the present invention is not necessarily limited to 'a node in a physical respect' but can be extended to 'a node in a logical respect'. 'A node in a logical respect' refers to a transmission pilot signal recognized as a node by a user equipment. For example, an LTE terminal can recognize configuration information of a node through a cell-specific reference signal (CRS) or a channel state information reference signal (CSI-RS) port(s). Therefore, a node recognized logically by a user equipment may be different from an actual physical node. For example, in case of a cell from which N CRS ports are transmitted, an LTE terminal may perceive the cell as a single node having N transmit antennas. However, physical node configuration of this cell can be realized in various ways. For example, two nodes in the cell may perform transmission in units of N/2 CRS ports. As another example, a plurality of nodes having N transmit antennas may transmit N CRS ports in a single frequency network (SFN) style.

After all, the relationship between a physical node and a logical node may be transparent from the respect of a user equipment; therefore, a user equipment may recognize a node in a logical respect and then perform transmission and reception processing. In the LTE-A system, a logical node may be recognized as one of CSI-RS resources (or pattern). For example, if a plurality of CSI-RS resources is configured for a user equipment, the user equipment recognizes each of CSI-RS resources as one logical node and performs transmission and reception processing.

In what follows, an antenna to be described in an embodiment of the present invention may be replaced with an antenna port, a virtual antenna, a group of antennas, and so on as well as a physical antenna.

In a multiple distributed, multi-node system, a user equipment has to carry out coherent demodulation for various downlink physical channels. For a user equipment to carry out coherent demodulation, it is necessary to perform downlink channel estimation. In order for a user equipment to perform downlink channel estimation, a reference symbol known to the user equipment may be inserted into time-frequency grids (or resource grids) of OFDM for channel estimation. The reference symbol above may be regarded as a downlink reference symbol. Examples of a reference symbol may include the following.

(1) A cell-specific reference signal (CRS) is transmitted from individual downlink sub-frames and all the resource blocks and can cover the whole cell bandwidth. In case a transmission mode is 7, 8, or 9, a CRS can be used as a reference signal for coherent demodulation of a signal transmitted through a physical channel, excluding a PMCH (Physical Multicast Channel) and a PDSCH (Physical Downlink Shared Channel). The transmission mode of 7, 8, or 9 corresponds to the case where non-codebook based precoding is carried out.

Also, a CRS can be used for obtaining channel-state information (CSI) and a user equipment can determine which cell to select and whether to perform hand-over based on the CRS.

(2) A demodulation reference signal (DM-RS) can be also defined as a UE-specific reference signal. In case transmission mode is 7, 8, or 9, a DM-RS can be used for measurement of a PDSCH (Physical Downlink Shared Channel). The term of UE-specific indicates that each demodulation reference signal (DM-RS) is used for channel measurement by a single user equipment. In other words, a DM-RS is transmitted through a resource block which is transmitted to a particular user equipment through the PDSCH.

(3) A CSI reference signal (CSI-RS) refers to a reference signal used for obtaining channel-state information (CSI). Since a CSI-RS has an extremely low time/frequency density, its overhead is relatively low compared with that of the CRS described above.

(4) An MBSFN reference signal is used for channel measurement for coherent demodulation in MCH (multicast channel) transmission which makes use of an MBSFN (Multicast-Broadcast Single Frequency Network).

(5) A positioning reference signal is a reference signal used for improving LTE positioning functionality. It is used for measuring a geographic position of a user equipment in a plurality of LTE cells. The positioning reference signal in a particular cell can obtain a high SIR (Signal-to Interference Ratio) by utilizing the signal at empty resource element positions of adjacent cells.

In what follows, a method for channel estimation by using a CSI-RS in a multiple node distributed system according to an embodiment of the present invention will be described.

Figure 2:
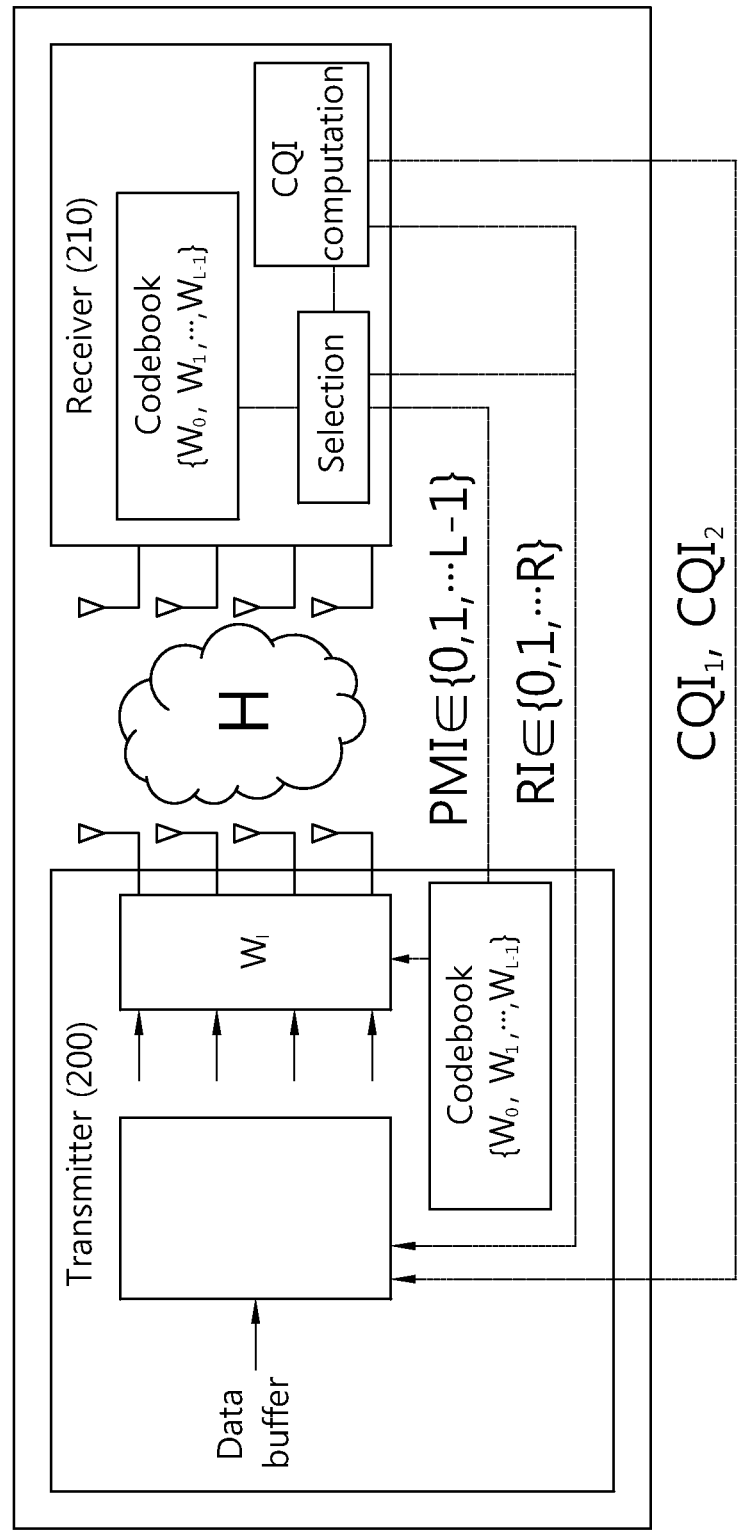
FIG. 2 illustrates transmission of a CSI-RS and feedback of a CSI-RS measured at a user equipment.

FIG. 2 illustrates transmission of a CSI-RS and feedback of a CSI-RS measured at a user equipment.

With reference to FIG. 2, a receiver 210 provides channel information calculated based on a CSI-RS transmitted from a transmitter 200 to the transmitter 200 as feedback by using parameters such as RI (Rank Information), PMI (Precoding Matrix Index), CQI (Channel Quality Indicator), and so on. Parameters describing channel information such as RI, PMI, and CQI may be called channel state information (CSI).

(1) RI (Rank Index) provides the transmitter 200 with a recommendation for a transmission rank to be used. In other words, information about the number of layers employed for downlink transmission is provided to the transmitter.

(2) PMI (Precoding Matrix Index) can be used for specifying a precoder matrix used for downlink transmission. A precoder matrix is determined by estimating the number of layers specified by RI.

(3) CQI (Channel-Quality Indication) provides the transmitter 200 with information about the modulation coding scheme of the highest priority.

The receiver 210 reports the channel state by transmitting information such as RI, PMI, and CQI showing the channel state as feedback information for a CSI-RS transmitted from the transmitter 200.

Since the CRS described above is also a reference signal which can be used for obtaining channel-state information, the functionality of the CRS may overlap with that of a CSI-RS. A CSI-RS may be used to compensate for the CRS, the existing reference signal, in the following two reasons.

(1) The LTE release 8 specifies a maximum of four reference signals in a single cell. However, since the LTE release 10 supports eight transmission antennas for a single base station, downlink spatial multiplexing is possible up to eight layers. In this reason, a CSI-RS may be used as a reference signal for increasing CSI capability rather than the CRS which has been a reference signal in the LTE release 8.

(2) Time-frequency density of the existing CRS is high since the CRS has been configured to carry out channel measurement in a rapidly changing channel state. On the other hand, since a CSI-RS is a reference signal targeted only at the CSI, time-frequency density of the CSI is low and has relatively low overhead compared with that of the CRS. Therefore, instead of extending the CRS which is the existing reference signal, a CSI-RS having low time-frequency density and low overhead can be defined as a new type of reference signal.

A single cell can employ 1, 2, 4, or 8 CSI-RSs as the unit for a resource block pair. The CSI-RS structure (or CSI-RS configuration) according to which a CSI-RS is disposed in the resource grids may have different forms of CSI-RS structure according to the number of CSI-RSs used in a single cell. For example, in case one CSI-RS is used from a resource block pair, the CSI-RS can form 40 combinations different from each other.

A resource block pair is the unit of resources including two resource blocks; one resource block may from a resource unit including 12 subcarriers along the frequency axis and including 7 OFDM symbols along the time axis.

Figure 3:
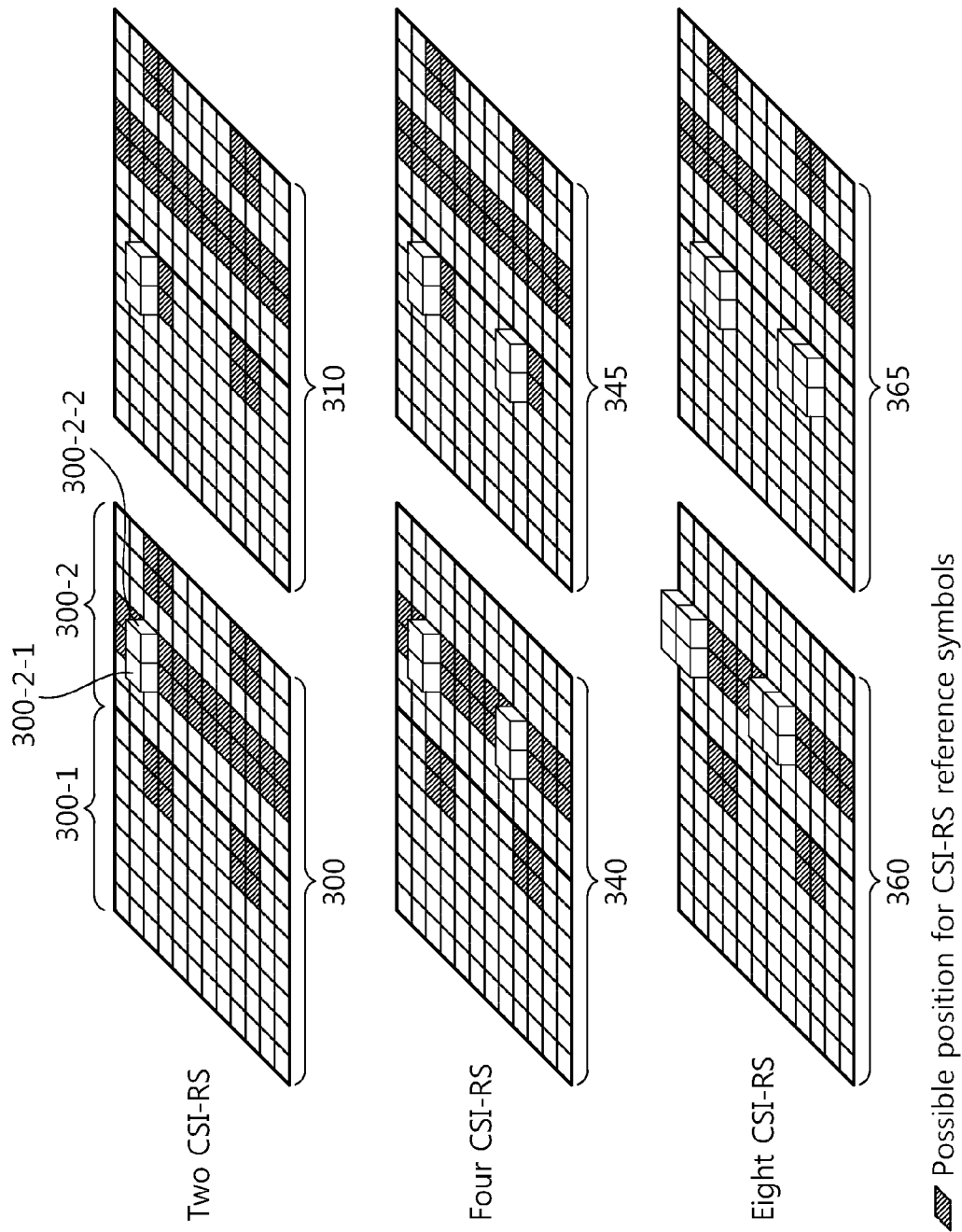
FIG. 3 illustrates possible positions of a CSI-RS in a resource block pair according to the number of CSI-RS.

FIG. 3 illustrates possible positions of a CSI-RS in a resource block pair according to the number of CSI-RS.

With reference to FIG. 3, FIG. 3 assumes a case where the resource block pair 300, 310 uses two CSI-RSs. Shaded areas correspond to the part of resource grids where a CSI-RS can be positioned.

For example, two CSI-RSs 300-2-1, 300-2-2 can be positioned at two consecutive reference elements of one resource block 300-2 along the time axis. Each of the two CSI-RS 300-2-1, 300-2-2 can be made to have no inference on each other by using orthogonal cover codes (OCCs). Two CSI-RSs can be positioned at a resource element marked with shading and in case two CSI-RSs are used in one resource block pair, 20 combinations are possible for the resource block pair.

Referring to FIG. 3 again, 1) a case where four CSI-RSs are used in one resource block pair 340, 345 and 2) a case where eight CSI-RSs are used in one resource block pair 360, 365 are disclosed.

In case of using four CSI-RSs, a resource block pair can support 10 different combinations of CSI-RS structures while the resource block pair can support five different combinations of CSI-RS structures in case of using eight CSI-RSs.

In case of using one CSI-RS in a resource block pair, the same CSI-RS structure can be utilized as the case where two CSI-RSs are used in the resource pair block 300, 310 of FIG. 1.

In a respect of time domain, the period at which a CSI-RS is transmitted varies from 5 ms (every five sub-frames) to 80 ms (every eight sub-frames). In case one CSI-RS is transmitted at every 5 ms, the overhead from using a CSI-RS amounts to 0.12%. To remove interference on or from adjacent cells, a sub-frame through which a CSI-RS is transmitted can be made to have different values from adjacent cells in the time domain, too.

FIG. 3 illustrates a case where one resource block carries a CSI-RS in the frequency domain; however, since each and every resource block is capable of transmitting the CSI-RS in the frequency domain, the CSI-RS can be transmitted through the whole cell bandwidth.

Again, with reference to FIG. 3, as described above, a CSI-RS may be used at a different position in the resource element rather than the current CSI-RS position. Among resource elements corresponding to potential CSI-RS positions, those resource elements not used for CSI-RSs can be utilized for transmission of data symbols.

In another implementation, the resource elements corresponding to potential CSI-RS positions may be used for muted CSI-RSs (or zero power CSI-RSs). A muted CSI-RS has different structure from conventional CSI-RS structure in that nothing is transmitted at the position of the corresponding resource element.

In case other adjacent cells transmit a CSI-RS, the muted CSI-RS of a current cell may become a "transmission hole" which can be utilized in two ways as follows.

(1) A transmission hole helps a user equipment receive a CSI-RS of an adjacent cell without being influenced by transmission from its own cell. By receiving CSI-RSs from adjacent cells, channel information of adjacent cells is obtained. The channel information based on CSI-RSs of adjacent cells can be exploited by a multi-cell transmission technology such as CoMP (Cooperative Multi-Point).

(2) A transmission hole reduces interference on CSI-RS transmission in other cells. In a heterogeneous network with overlapping cells, interference from a signal of a current cell exerted on signals of other cells can be avoided by removing energy from other cells impinged on resource element positions at which CSI-RSs are transmitted.

In case of receiving CSI-RSs of adjacent cells such as the case (1), since muted CSI-RSs are used for a set of CSI-RSs employed by adjacent cells, muted CSI-RSs consisting of a multiple number of sets may be used. As described in the case of (2) above, in order to prevent occurrence of interference between CSI-RSs of the user equipment's current cell and its overlapping cells, muted CSI-RSs comprising a single set may be used.

Figure 4:
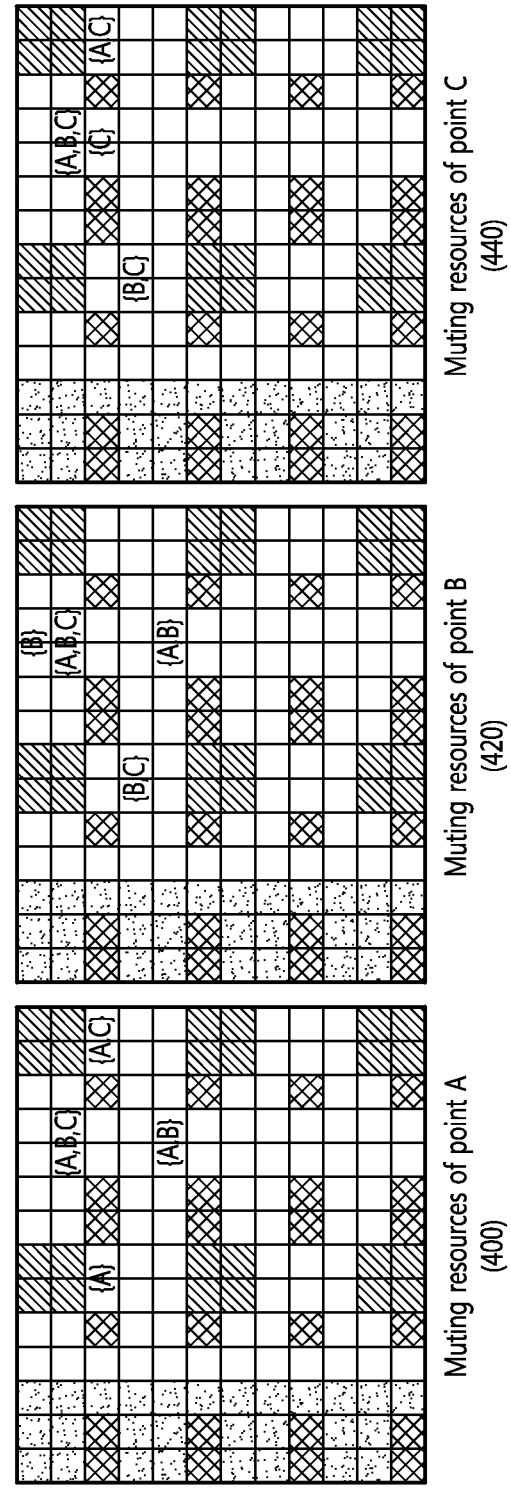
FIG. 4 illustrates a method for measuring interference based on a muted CSI-RS (zero-power CSI-RS)

FIG. 4 illustrates a method for measuring interference based on a muted CSI-RS (zero-power CSI-RS).

Among CSI, in measuring CQI in particular, a modulation and coding level can be determined correctly only when the amount of interference is measured accurately. A method of assigning an interference measurement resource area by using muted CSI-RS (or zero-power CSI-RS) configuration may be employed; the method enables a base station to make a user equipment assign particular resource elements (REs) as those REs meant for interference measurement and perform interference measurement in the corresponding REs. For example, suppose a multiple, distributed node system includes three nodes {A, B, C}. If the node A sends no particular signal to the particular RE positions through which the nodes B, C transmit data (namely, if the node A carries out muting), a user equipment is able to measure the amount of interference due to the nodes {B, C}. In other words, by making the user equipment(s) intending to receive data from the node A measure interference at the corresponding RE position, interference generated from the nodes B, C can be measured.

For example, in case a cell contains three nodes {A, B, C}, interference from adjacent nodes can be measured by muting four patterns for each node at the resource block pairs 400, 420, 440. From the resource blocks 400, 420, 440, the sets in parentheses refer to a serving node set which serves the user equipment and the user equipments making use of the set as a serving node set are capable of measuring interference at the corresponding RE positions. For example, the user equipment receiving data from the nodes A and C can measure interference from the node B by measuring interference at the RE positions of the resource block 400 marked as {A, C} positions, which includes the interference from the node B. Theoretically, a maximum of 2N−1 muting patterns are needed for a system containing a total of N nodes and accordingly, a maximum of 2N−1 patterns have to be muted for each node. The muting resource overhead increases exponentially as N increases.

As described above, to apply a method for measuring interference based on a zero-power CSI-RS, the zero-power CSI-RS can inform the user equipment at the time of configuring the zero-power CSI-RS about 1) whether the corresponding resources are intended for interference measurement or 2)

whether the corresponding resources are intended for reducing interference on adjacent nodes.

Figure 5:
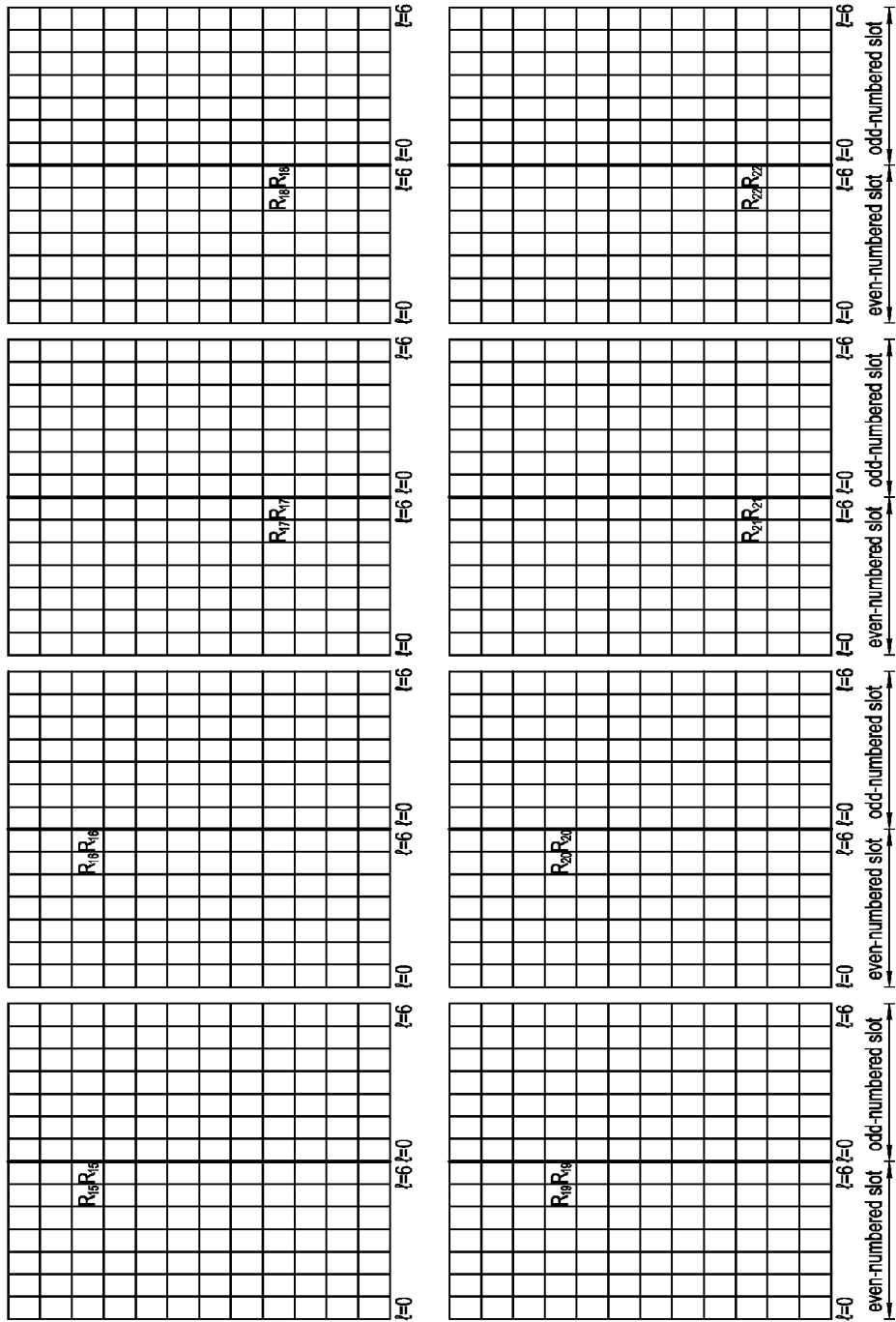
FIG. 5 illustrates multiple structures in which a CSI-RS is mapped in a resource block pair.

FIG. 5 illustrates multiple structures in which a CSI-RS is mapped in a resource block pair.

In the following embodiment, for the convenience of description, it is assumed that a resource block pair contains two CSI-RSs; however, as described above, 1, 4, or 8 CSI-RSs may be included in the resource block pair.

With reference to FIG. 5, to reduce inter-cell interference in a multi-cell environment such as HetNet, a CSI-RS can have different configurations (or structures) in a resource block pair.

The CSI-RS configuration within a resource block pair may vary according to the number of antenna ports within a cell and CSI-RS configurations are constructed in such a way to differ from each other as possibly as can be.

Also, the CSI-RS configuration within a resource block pair can be identified according to the cyclic prefix (CP) type; the CSI-RS configuration may be further divided into the case where it is applied to both of frame structure 1 and frame structure 2 and the case where it is applied only to the frame structure 2 (here, the frame structure 1 and the frame structure 2 denotes either TDD (Time Division Duplex) or FDD (Frequency Division Duplex)).

Also, different from the CRS, a CSI-RS supports up to 8 ports (p=15, p=15, 16, p=15, . . . , 18 and p=15, . . . , 22) and is defined for $\Delta f=15$ kHz.

The CSI-RS configuration can be calculated as follows.

A sequence $r_{l,n_s}(m)$ of the CSI-RS is generated according to the equation below:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \langle\text{Eq. 1}\rangle$$

$$m = 0, 1, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

where $n_s$ is a slot number within a radio frame; and is the OFDM symbol number within the slot. $c(i)$ is a pseudo random sequence and is initiated as $c_{init}$ from each OFDM symbol. $N_{ID}^{cell}$ denotes a physical layer cell ID.

The pseudo-random sequence $r_{l,n_s}(m)$ generated from a seed value based on a cell ID can be resource-mapped into a complex-valued modulation symbol $\alpha_{k,l}^{(p)}$. The equation 2 shown below maps the reference signal sequence $r_{l,n_s}(m)$ into a complex-valued modulation symbol $\alpha_{k,l}^{(p)}$ for an antenna port p in sub-frames configured to transmit CSI-RSs.

$$a_{k,l}^{(p)} = w_{l''} \cdot r_{l,n_s}(m') \quad \langle\text{Equation 2}\rangle$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} 1'' & \text{CSI reference signal configuration } 0 - 19, \\ & \text{normal cyclic prefix} \\ 21'' & \text{CSI reference signal configuration } 20 - 31, \\ & \text{normal cyclic prefix} \\ 1'' & \text{CSI reference signal configuration } 0 - 27, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the equation 2, (k',l') and $n_s$ are obtained from Tables 1 and 2 described later. The CSI-RS ($n_s$ mode 2) can be transmitted through a downlink slot satisfying the conditions of Tables 1 and 2 described later.

The following Table 1 illustrates CSI-RS configuration about a normal CP.

TABLE 1

| | | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |

TABLE 1-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

The following Table 2 illustrates CSI-RS configuration about an extended CP.

TABLE 2

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

A few CSI-RS configurations may be used for one cell, where a non-zero power CSI-RS may employ zero or one configuration while a zero-power CSI-RS may employ zero or several configurations.

As shown in Table 1, in case of zero-power CSI-RS, 16 cases out of the four ports is represented by a 16-bit bitmap and various configurations can be set up by assigning '1' to each bit. The bitmap is specified by ZeroPowerCSI-RS of an upper layer. However, it should be noted that those REs configured for non-zero power CSI-RSs are excluded. The most significant bit (MSB) corresponds to the lowest CSI-RS configuration index and the configuration index in the ascending order is determined according to the bit order.

The following case assumes that the user equipment does not transmit a CSI-RS.

In a set S, where
S={15}, S={15,16}, S={17,18}, S={19,20} or S={21,22},
within a special sub-frame of FS type 2
within a sub-frame where a CSI-RS collides with synchronization signals, PBCH, and SystemInformationBlock-Type1 messages
within a sub-frame through which a paging message is transmitted,
a resource element (RE) transmitting a CSI-RS of one antenna port is not used for transmission of CSI-RSs of a PDSCH or other antenna ports.

The sub-frame configuration $I_{CSI-RS}$ of a CSI-RS is specified by the upper layer and as shown in Table 3, provides information about the sub-frame configuration and sub-frame offset value of the CSI-RS.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Table 4 below shows CSI-RS configuration IE (Information Element).

TABLE 4

```
--ASN1START
CSI-RS-Config-r10 ::=   SEQUENCE {
    csi-RS-r10              CHOICE {
        release                 NULL,
        setup                   SEQUENCE {
            antennaPortsCount-r10   ENUMERATED {an1, an2, an4,
                                    an8},
            resourceConfig-r10      INTEGER (0..31),
            subframeConfig-r1       INTEGER (0..154),
            p-C-r10                 INTEGER (-8..15)
        }
    }
                                    OPTIONAL,  -- Need ON
    zeroTxPowerCSI-RS-r10   CHOICE {
        release                 NULL,
        setup                   SEQUENCE {
            zeroTxPowerResourceConfigList-r10   BIT STRING
                                                (SIZE (16)),
            zeroTxPowerSubframeConfig-r10       INTEGER (0..154)
        }
    }
                                    OPTIONAL   -- Need ON
}
--ASN1STOP
```

The CSI-RS configuration IE (Information Element) may include information about antennaPortsCount, resourceConfig, subframeConfig, and p-C-r10 as parameters for configuring a CSI-RS, which is a reference signal for CSI-RS-Config-r10 information. Also, the CSI-RS configuration IE may incorporate a plurality of parameters into zeroTxPower-RS-r10 as parameters for configuring a muted CSI-RS (zero-power CSI-RS).

In other words, the CSI-RS configuration IE may include information about configuration of a CSI-RS and a zero-power CSI-RS.

The parameters included in the configuration IE may include information disclosed in Table 5 below.

TABLE 5

| CSI-RS-Config field descriptions |
| --- |
| antennaPortsCount |
| Parameter represents the number of antenna ports used for transmission of CSI reference signals where an1 corresponds to 1, an2 to 2 antenna ports etc see TS 36.211 [1, 6.10.5]. |
| p-C |
| Parameter: $P_c$, see TS 36.213 [2, 7.2.5]. |
| resourceConfig |
| Parameter: CSI reference signal configuration, see TS 36.211 [1, table 6.10.5.2-1 and 6.10.5.2-2]. |
| subframeConfig |
| Parameter: $I_{CSI-RS}$, see TS 36.211 [1, table 6.10.5.3-1]. |
| zeroTxPowerResourceConfigList |
| Parameter: ZeroPowerCSI-RS. see TS 36.211 [1.6.10.5.2]. |
| zeroTxPowerSubframeConfig |
| Parameter: $I_{CSI-RS}$, see TS 36.211 [1, table 6.10.5.3-1]. |

In what follows, a method for dropping one reference signal when CSI-RSs described above with different objectives in a multiple, distributed node system according to an embodiment of the present invention will be described. However, the present invention can also be applied to the case where a CSI-RS is transmitted from a single node to the user equipment in addition to the application to a multiple, distributed node system and an embodiment related to the case above also belongs to the technical scope of the present invention.

Collision among the CSI-RSs having different objectives from each other may occurs during transmission as in the case where the CSI-RSs have to be transmitted simultaneously from the same resource elements. According to an embodiment of the present invention, for this case, which intended use to choose is published from among a plurality of objectives of the respective CSI-RSs transmitted from a network and the user equipment.

In what follows, in an embodiment of the present invention, in case CSI-RSs having a plurality of different objectives from each other are transmitted from the same resource element at the same time, a CSI-RS transmitted from the position where collision is occurred is defined by the term of a dropping CSI-RS.

In other words, in an embodiment of the present invention, which objective a dropping CSI-RS has for the user equipment and a network is determined and accordingly, the CSI-RS is exploited.

A CSI-RS can be used for various purposes. For example, (1) CSI measurement/feedback: Based on a CSI-RS transmitted by a transmitter, a receiver provides CSI (e.g., PMI, RI, CQI, sub-band selection, and so on), which is the channel information, to the transmitter.

(2) UL pathloss measurement: A conventional CRS-based pathloss measurement can be extended to pathloss measurement based on a CSI-RS, including an RRH system (or a distributed antenna system) inappropriate for UL power control, UL CoMP case, a new carrier for which a CRS is not provided, and so on.

(3) Long-term measurement such as RSRP/RSRQ/RSSI for point selection: A UE obtains information needed for a network to select a DL and/or a UL point(s) among a plurality of points supposed to provide a service for the UE by making a CSI-RS a measurement target and provides the information as feedback for the network (4) Interference measurement: A zero transmit power CSI-RS may be used for measuring interference; depending on the situation, the amount of interference may be obtained or compensated by using a non-zero transmit power CSI-RS.

The CSI-RS can be exploited for various other objectives in addition to the objectives described above.

A plurality of CSI-RSs may be transmitted to the user equipment for various uses/objectives described above and one CSI-RS may be exploited to fulfill one or more uses/objectives.

A CSI-RS may utilize a different period according to the use/objective of the signal. For example, a CSI-RS intended for the uses of (1) and (4) described above is meant to provide channel status quickly as feedback; therefore, the CSI-RS has a relatively shorter period than that of CSI-RS resources intended for the uses of (2) and (3). In transmitting CSI-RSs having different objectives and periods, in case the CSI-RSs have the periods overlapping with each other and share resource element positions among them, the CSI-RSs having different objectives may collide with each other.

Figure 6:
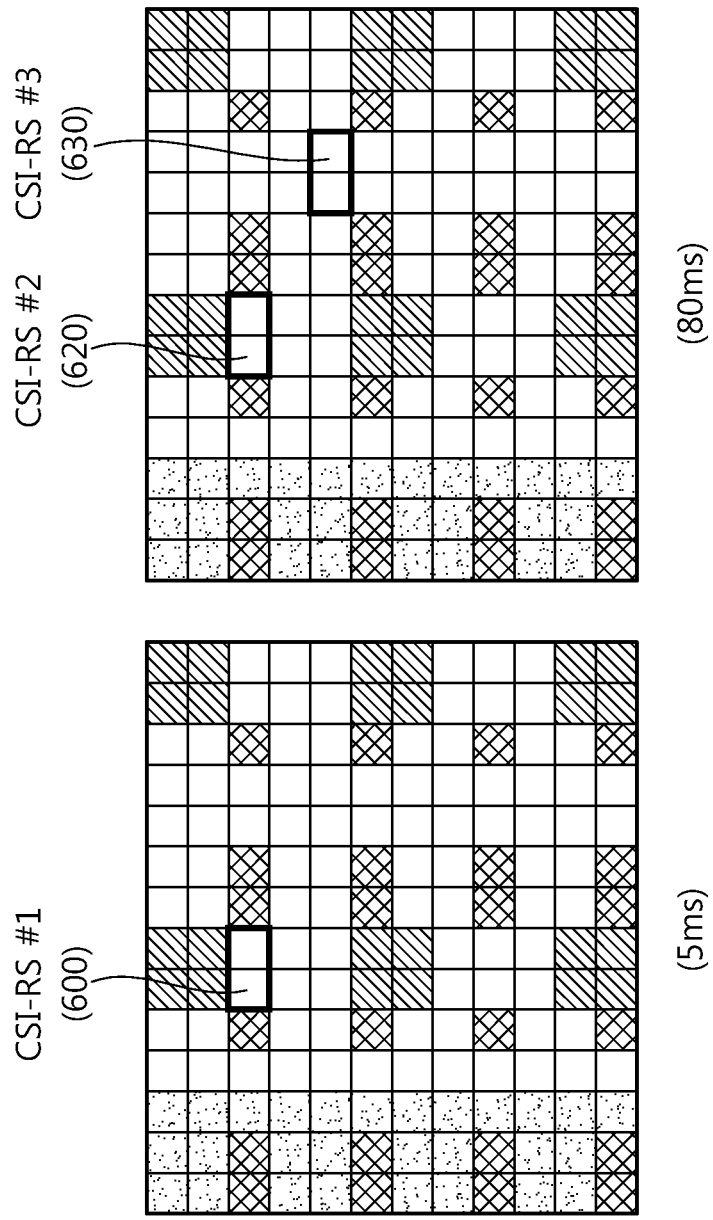
FIG. 6 illustrates a case where CSI-RSs of separate objectives collide with each other.

FIG. 6 illustrates a case where CSI-RSs of separate objectives collide with each other.

With reference to FIG. 6, a CSI-RS #1 600 for providing a resource element (RE) with CSI feedback is incorporated into a resource block pair at a period of 5 ms.

Also, a CSI-RS #2 620 for long-term measurement is transmitted to an RE at the same position as the CSI-RS #1 600 at a period of 80 ms while a CSI-RS #3 630 for long-term measurement is transmitted to an RE at a different position at a period of 80 ms.

The resourceConfig and subframeConfig of the CSI-RS #1 600 for CSI feedback, the CSI-RS #2 620 for long-term measurement, and the CSI-RS #3 630 can be expressed as shown in Table 6.

TABLE 6

| CSI-RS index | resourceConfig | subframeConfig |
|---|---|---|
| CSI-RS #1 for CSI feedback | 0 | 0 |
| CSI-RS #2 for long-term measurement | 0 | 75 |
| CSI-RS #3 for long-term measurement | 1 | 75 |

The resourceConfig of Table 6 represents which RE (Resource Element) within a resource block the CSI-RS is transmitted through, while the subframeConfig represents at which period and with which offset the CSI-RS is transmitted. Based on the resourceConfig and the subframConfig, it can be known that the CSI-RS #1 and the CSI-RS #2 collide with each other.

The recourceConfig is described in Tables 1 and 2 and the subframeConfig is described in Table 3.

In other words, the CSI-RS #1 600 and the CSI-RS #2 620 exist at the same resource element position; according to Table 4, in case the subframeConfig is 0, the CSI-RS #1 600 has a CSI-RS period of 5 ms while, in case the subframeConfig is 75, the CSI-RS #2 620 has a CSI-RS period of 80 ms. Therefore, the CSI-RS #1 600 and the CSI-RS #2 620 may collide with each other at every 80 ms.

In other words, in case a plurality of CSI-RSs are configured on the resource grids and subsequently transmitted to the UE as described above, part of the CSI-RSs may collide with each other at those time points where the periods overlap with each other even though the periods of the CSI-RSs may differ from each other.

Even though the network is capable of managing all the CSI-RS resources in such a way not to collide with each other for any case, management complexity to avoid collision increases as the number of points (or nodes) and the UEs grow.

Therefore, in an embodiment of the present invention, in case CSI-RSs having different objectives from each other collide with each other, a priority order for interpreting which objective the corresponding dropping CSI-RS has is determined and based on the priority order, the UE interprets and exploits the dropping CSI-RS.

In other words, according to the present invention, in case collision occurs among CSI-RSs in a particular sub-frame, a dropping CSI-RS at the position of the collision can be transmitted to the UE and interpreted as a CSI-RS corresponding to one objective.

Various criteria may be applied to determine the objective of a dropping CSI-RS. For example, 1) period of the CSI-RS, 2) intended use of the CSI-RS, and 3) priority for the respective CSI-RS resources indicated by higher layer signaling.

1) In case the objective of a dropping CSI-RS is determined based on the period of the CSI-RS, for example, a dropping CSI-RS can be interpreted as a CSI-RS having a relatively longer period. This is because in case a CSI-RS of a long period is once dropped, the UE may not be able to receive a CSI-RS of a long period for a long time.

As shown in FIG. 6, in case the CSI-RS #1 600 having a period of 5 ms and the CSI-RS #2 620 having a period of 80 ms collide with each other, the dropping CSI-RS being transmitted can be employed for the objective of the CSI-RS #2 620.

In other words, according to an embodiment of the present invention,

1) A first CSI-RS configuration information including sub-frame information which is transmission resource information of a first CSI-RS and through which the first CSI-RS information is transmitted; and resource element information which contains the first CSI-RS is received.

2) A second CSI-RS configuration information including sub-frame information which is transmission resource information of a second CSI-RS and through which the second CSI-RS information is transmitted; and resource element information which contains the second CSI-RS is received.

3) In case transmission resources of the first CSI-RS according to the first CSI-RS configuration and transmission resources of the second CSI-RS according to the second CSI-RS configuration overlap with each other, whether a CSI-RS (dropping CSI-RS) received from the overlapping transmission resources corresponds to the first or the second CSI-RS is determined according to a priority order.

As shown in FIG. 6, to determine whether a CSI-RS received from transmission resources according to the period of the CSI-RS corresponds to the first CSI-RS or the second CSI-RS, a period at which the first CSI-RS is received is calculated based on the first CSI-RS transmission resource information and a period at which the second CSI-RS is received is calculated based on the second CSI-RS transmission resource information. The UE, based on the calculated period, can determine whether a CSI-RS received from the overlapping transmission resources corresponds to the first or the second CSI-RS.

Figure 7:
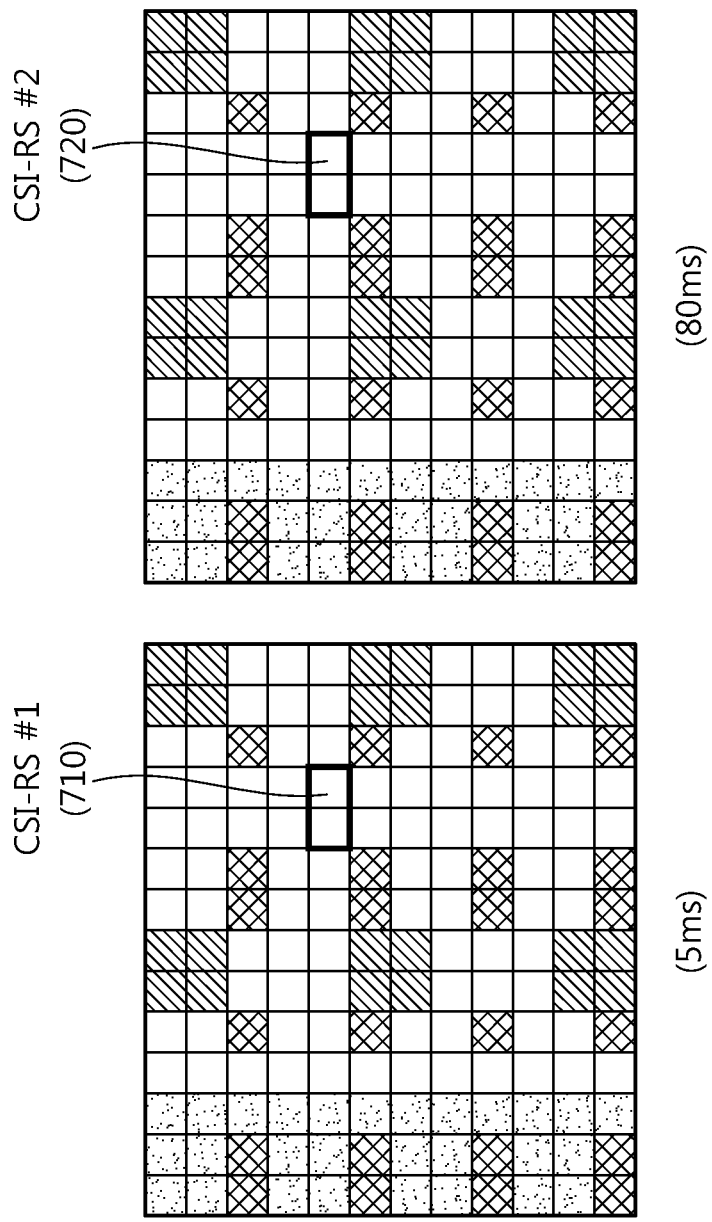
FIG. 7 illustrates a case where CSI-RSs of separate objectives collide with each other.

FIG. 7 illustrates a case where CSI-RSs of separate objectives collide with each other.

With reference to FIG. 7, CSI-RSs having different periods and objectives from each other may exist at the same resource element.

In case of the CSI-RS #1 710, it is assumed to be used for CSI feedback while the CSI-RS #2 720 is assumed to be used as a reference signal transmitted for interference measurement/compensation.

For example, if the priority of a dropping CSI-RS is predefined as follows: (1) CSI measurement/feedback, (2) UL pathloss measurement, (3) long-term measurement such as RSRP/RSRQ/RSSI for point selection, and (4) interference measurement, since the CSI-RS #1 710 having the objective of CSI measurement/feedback has the top priority, in case of collision with the CSI-RS #2 720, the UE interprets the dropping CSI-RS as the CSI-RS #3 720. The priority order to manage CSI-RS dropping can be changed adaptively, which will be descried in more detail with reference to FIG. 8.

In other words, as shown in FIG. 7, to determine whether a CSI-RS (dropping CSI-RS) received from the transmission resources overlapping with each other according to the use of the CSI-RS corresponds to the first or the second CSI-RS, the use for which the first CSI-RS is received and utilized and the use for which the second CSI-RS is received and utilized are determined. Based on the use for which the first CSI-RS is received and utilized and the use for which the second CSI-RS is received and utilized, it is determined whether a CSI-RS received from the overlapping transmission resources corresponds to the first or the second CSI-RS.

Figure 8:
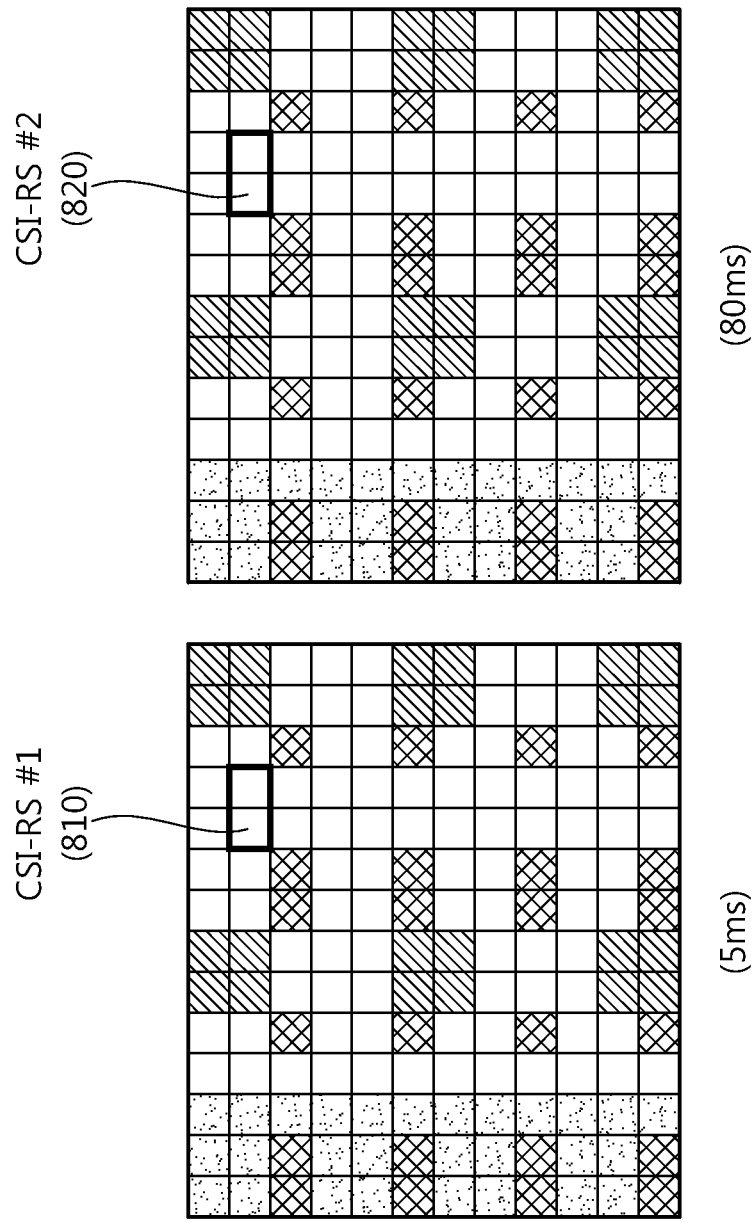
FIG. 8 illustrates a case where CSI-RSs of separate objectives collide with each other.

FIG. 8 illustrates a case where CSI-RSs of separate objectives collide with each other.

With reference to FIG. 8, in case dropping CSI-RSs are interpreted according to the priorities of the respective CSI-RS resources indicated by higher layer signaling, much more flexibility can be provided for a network and UEs in interpreting the dropping CSI-RSs.

Even if CSI-RSs with separate objectives collide with each other, depending on situations or operating principles of a network, the importance of utilizing the colliding, dropping CSI-RSs for which objective varies. Thus a network may determine and assign the priorities about the objective of the dropping CSI-RS.

For example, in case the CSI-RS #1 810 for point selection and the CSI-RS #2 820 for CSI feedback collide with each other, in terms of period, the UE interprets the CSI-RS #2 820 having a longer period as the corresponding, dropping CSI-RS.

However, depending on networks, it may be more preferable to use the corresponding CSI-RS as the CSI-RS#2 820. For example, in case of a network capable of receiving uplink signals of the UE from various points and estimating link quality between the respective points and the UE, point selection can be carried out without employing the CSI-RS #1 810. Therefore, it may be more advantageous for the network to use the CSI-RS #2 820 as the dropping CSI-RS for CSI feedback.

The priorities for interpreting the dropping CSI-RS as described above is only an embodiment; thus, other methods for determining priorities of interpreting the dropping CSI-RS can be employed and such embodiments also belong to the technical scope of the present invention.

In other words, to determine whether the CSI-RS (dropping CSI-RS) received from the overlapping transmission resources according to the information corresponds to the first or the second CSI-RS, the upper layer receives information with which to determine whether the CSI-RS received from the overlapping transmission resources corresponds to the first or the second CSI-RS and based on the information received by the upper layer, determines whether the CSI-RS corresponds to the first or the second CSI-RS. The information received by the upper layer may be used for determining whether a CSI-RS received from the overlapping transmission resources corresponds to the first or the second CSI-RS by the upper layer's deciding a CSI-RS between the first and the second CSI-RS needed for a network in the first place.

Figure 9:
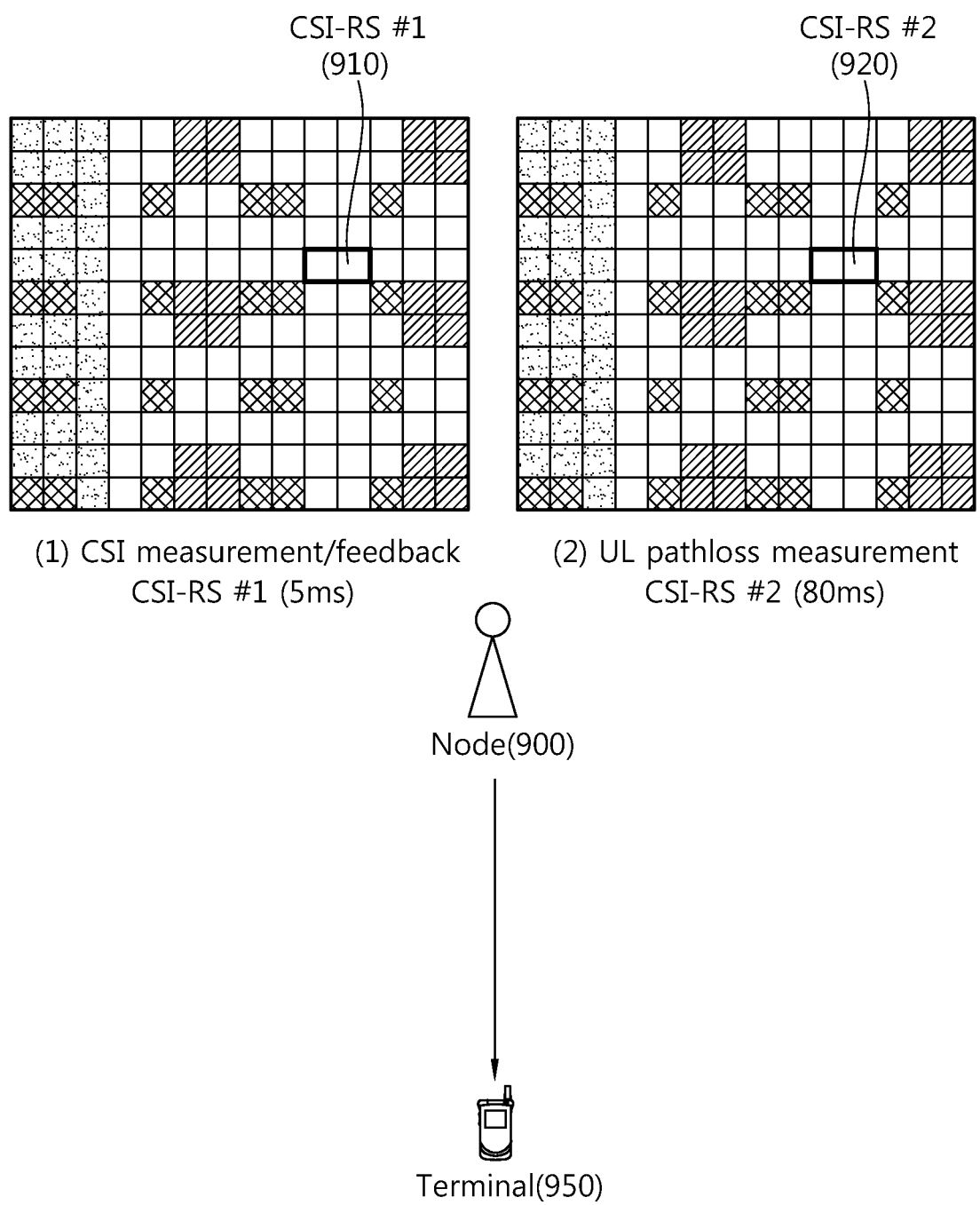
FIG. 9 illustrates a method for analyzing a CSI-RS in a user equipment and a node according to an embodiment of the present invention.

FIG. 9 illustrates a method for analyzing a CSI-RS in a user equipment and a node according to an embodiment of the present invention.

FIG. 9 assumes that (1) the period of the CSI-RS #1 910 transmitted from a node 900 for the purpose of CSI measurement/feedback is 5 ms; and (2) the period of the CSI-RS #2 920 used for UL pathloss measurement is 80 ms and the positions of the CSI-RS #1 910 and the CSI-RS #2 920 overlap with each other in a resource block pair.

In case the CSI-RSs intended for different objectives overlap with each other at the same resource element positions and at the same time point, the UE 950 has to determine the objective of the CSI-RS transmitted between the objectives of the CSI-RS #1 910 and the CSI-RS #2 920.

The UE 950 is capable of determining whether a transmitted CSI-RS (Channel State Information Reference Signal) is a dropping CSI-RS (a dropping CSI-RS is defined as a CSI-RS transmitted from the position where collision is occurred in case CSI-RSs having a plurality of different objectives from each other are transmitted from the same resource element at the same time). In case the transmitted CSI-RS corresponds to a dropping CSI-RS, the dropping CSI-RS can be interpreted as a CSI-RS having one objective based on the priorities. Whether a transmitted CSI-RS (Channel State Information Reference Signal) corresponds to a dropping CSI-RS can be determined based on whether the plurality of CSI-RSs collide with each other based on resourceConfig and subframeConfig.

In case two CSI-RSs are dropping CSI-RSs overlapping with each other at one resource element at the same time, the UE can determine the objective for a transmitted CSI-RS based on a predetermined CSI-RS selection criterion such as 1) period of the CSI-RS, 2) intended use of the CSI-RS, and 3) priority for the respective CSI-RS resources indicated by higher layer signaling. The three selection criteria are one embodiment and the UE can interpret and utilize a CSI-RS based on various criteria rather than the criteria described above.

In the following embodiment of the present invention, a method for the UE 950 to analyze a CSI-RS according to the three criteria will be described.

(1) The case where the objective of a CSI-RS is determined by the period of the CSI-RS The UE is capable of figuring out which CSI-RS is transmitted at the same time point to the same resource element based on the information about periods of CSI-RSs having separate objectives.

For example, it may be the case that the CSI-RS #1 910 with a first period (5 ms) and the CSI-RS #2 920 with a second period (80 ms) collide with each other at the same time at the same resource element. In this case, the UE 950 compares the period of the CSI-RS #1 910 with that of the CSI-RS #2 920 and determines whether to decide a transmitted CSI-RS as the CSI-RS #1 910 or the CSI-RS #2 920.

In case the dropping CSI-RS is defined as the CSI-RS having a longer period, the UE 950 decides the transmitted CSI-RS as the CSI-RS #2 920 being transmitted at the second period (80 ms).

(2) The case where the objective of a CSI-RS is determined by the intended use of the CSI-RS The CSI-RS #1 910 with a first period (5 ms) and the CSI-RS 920 #2 with a second period (80 ms) may collide with each other at the same time at the same resource element. In this case, the UE compares the objective of the CSI-RS #1 910 with that of the CSI-RS #2 920 and determines whether to decide a transmitted CSI-RS as the CSI-RS #1 910 or the CSI-RS #2 920.

For example, in case the objective of (1) CSI measurement/feedback is preferred to the objective of (2) UL pathloss measurement, the UE decides the transmitted CSI-RS as the CSI-RS #1.

(3) The case where the objective of a CSI-RS is determined based on the priority for the respective CSI-RS resources indicated by higher layer signaling The CSI-RS #1 910 with a first period (5 ms) and the CSI-RS 920 #2 with a second period (80 ms) may collide with each other at the same time at the same resource element. In this case, the UE determines whether to decide a transmitted CSI-RS as the CSI-RS #1 910 or the CSI-RS #2 920 based on the information transmitted from an upper layer.

For example, in case the upper layer prefers (2) the CSI-RS #2 920 having the objective of UL pathloss measurement to (1) the CSI-RS #1 910 having the objective of CSI measurement/feedback, the UE decides the transmitted CSI-RS as the CSI-RS #2 920.

Figure 10:
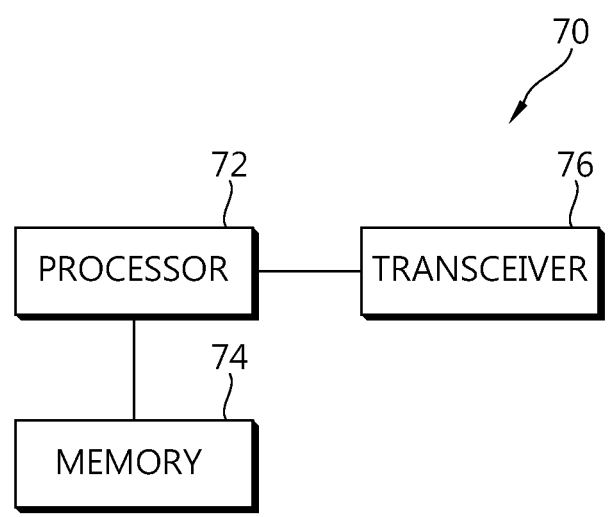
FIG. 10 illustrates a radio apparatus to which an embodiment of the present invention can be applied.

FIG. 10 illustrates a radio apparatus to which an embodiment of the present invention can be applied.

The radio apparatus 70 is a UE capable of realizing the embodiments described above, which may be an AP or non-AP STA (non-AP station).

The radio apparatus 70 comprises a processor 72, a memory 74, and a transceiver 76. The transceiver 76 transmits/receives radio signals and is realized in the form of a physical layer defined in the IEEE 802.11. The processor 76, being connected to the transceiver 76 functionally, realizes the MAC layer and a physical layer of the IEEE 802.11. The processor 72 determines whether a transmitted CSI-RS (Channel State Information Reference Signal) is a dropping CSI-RS according to an embodiment of the present invention and if the transmitted CSI-RS is found to be the dropping CSI-RS, interprets the dropping CSI-RS as a CSI-RS having one objective based on a priority. In other words, the processor 72 is configured to realize the embodiments of the present invention described above.

The processor 72 and/or the transceiver 76 may incorporate ASIC (Application Specific Integrated Circuit), other chipsets, logical circuits, and/or data processing apparatus. The memory 74 may incorporate Rom (Read-Only Memory), RAM (Random Access Memory), flash memory, memory card, storage media and/or other storage devices. In case the embodiments are implemented in the form of software, the techniques described above can be realized in the form of modules (procedures, functions, and so on) which carry out the functions described above. A module can be stored in the memory 74 and can be carried out by the processor 72. The memory 74 can be installed inside or outside the processor 72 and can be connected to the processor 72 through various means well known to the public.

The invention claimed is:

1. A method for CSI-RS (Channel State Information Reference Signal) dropping, comprising:
   receiving first CSI-RS configuration information including sub-frame information which is transmission resource information of a first CSI-RS and through which the first CSI-RS information is transmitted and resource element information which contains the first CSI-RS; receiving second CSI-RS configuration information including sub-frame information which is transmission resource information of a second CSI-RS and through which the second CSI-RS is transmitted and resource element information which contains the second CSI-RS; and
   in case transmission resources of the first CSI-RS according to the first CSI-RS configuration and transmission resources of the second CSI-RS according to the second CSI-RS configuration overlap with each other, determining according to a priority order whether a CSI-RS received from the overlapping transmission resources corresponds to the first or the second CSI-RS.

2. The method of claim 1, wherein, in case transmission resources of the first CSI-RS according to the first CSI-RS configuration and transmission resources of the second CSI-RS according to the second CSI-RS configuration overlap with each other, the determining according to a priority order whether a CSI-RS received from the overlapping transmission resources corresponds to the first or the second CSI-RS comprises:
   calculating a period at which the first CSI-RS is received based on the first CSI-RS transmission resource information and calculating a period at which the second CSI-RS is received based on the second CSI-RS transmission resource information; and
   determining based on the calculated period whether a CSI-RS received from the overlapping transmission resources corresponds to the first or the second CSI-RS.

3. The method of claim 2, wherein the determining based on the calculated period whether a CSI-RS received from the overlapping transmission resources corresponds to the first or the second CSI-RS comprises:
   determining a CSI-RS received from the overlapping transmission resources as the first CSI-RS in case the period of the first CSI-RS is longer than that of the second CSI-RS; and
   determining a CSI-RS received from the overlapping transmission resources as the second CSI-RS in case the period of the second CSI-RS is longer than that of the first CSI-RS.

4. The method of claim 1, wherein, in case transmission resources of the first CSI-RS according to configuration of the first CSI-RS and transmission resources of the second CSI-RS according to configuration of the second CSI-RS overlap with each other, determining according to a priority order whether a CSI-RS received from the overlapping transmission resources corresponds to the first or the second CSI-RS comprises:
   deciding a use for which the first CSI-RS is received and utilized and a use for which the second CSI-RS is received and utilized; and
   based on the use for which the first CSI-RS is received and utilized and the use for which the second CSI-RS is received and utilized, determining whether a CSI-RS received from the overlapping transmission resources corresponds to the first or the second CSI-RS.

5. The method of claim 1, wherein, the determining according to a priority order whether a CSI-RS received from the overlapping transmission resources corresponds to the first or the second CSI-RS in case transmission resources of the first CSI-RS according to the first CSI-RS configuration and transmission resources of the second CSI-RS according to the second CSI-RS configuration overlap with each other comprises:
   an upper layer's receiving information for determining whether a CSI-RS received from the overlapping transmission resources corresponds to the first or the second CSI-RS; and based on information received by the upper layer, determining whether a received CSI-RS corresponds to the first or the second CSI-RS.

6. The method of claim 5, wherein the information received by the upper layer is such information for determining whether a CSI-RS received from the overlapping transmission resources corresponds to the first or the second CSI-RS by the upper layer's deciding a CSI-RS between the first and the second CSI-RS needed for a network in the first place.

7. A user equipment, comprising:
   a transceiver receiving first CSI-RS (Channel State Information Reference Signal) configuration information including sub-frame information which is transmission resource information of a first CSI-RS and through which the first CSI-RS information is transmitted and resource element information which contains the first CSI-RS and receiving second CSI-RS configuration information including sub-frame information which is transmission resource information of a second CSI-RS and through which the second CSI-RS is transmitted and resource element information which contains the second CSI-RS; and
   a processor, in case transmission resources of the first CSI-RS according to the first CSI-RS configuration and transmission resources of the second CSI-RS according to the second CSI-RS configuration overlap with each other, determining according to a priority order whether a CSI-RS received from the overlapping transmission resources corresponds to the first or the second CSI-RS.

8. The user equipment of claim 6, wherein the processor calculates a period at which the first CSI-RS is received based on the first CSI-RS transmission resource information and calculating a period at which the second CSI-RS is received based on the second CSI-RS transmission resource information; and
   determines based on the calculated period whether a CSI-RS received from the overlapping transmission resources corresponds to the first or the second CSI-RS.

9. The user equipment of claim 7, wherein the processor, in case period of the first CSI-RS is longer than that of the second CSI-RS, determines a CSI-RS received from the overlapping transmission resources as the first CSI-RS and in case period of the second CSI-RS is longer than that of the first CSI-RS, a CSI-RS received from the overlapping transmission resources as the second CSI-RS.

10. The user equipment of claim 6, wherein the processor determines the use for which the first CSI-RS is received and utilized and the use for which the second CSI-RS is received and utilized; and based on the use for which the first CSI-RS is received and utilized and the use for which the second CSI-RS is received and utilized, determines whether a CSI-RS received from the overlapping transmission resources corresponds to the first or the second CSI-RS.

11. The user equipment of claim 6, wherein the processor determines in a receiving upper layer whether a received CSI-RS corresponds to the first or the second CSI-RS based on information for determining whether a CSI-RS received from the overlapping transmission resources corresponds to the first or the second CSI-RS.

12. The method of claim 6, wherein the information received by the upper layer is such information for determining whether a CSI-RS received from the overlapping transmission resources corresponds to the first or the second CSI-RS by the upper layer's deciding a CSI-RS between the first and the second CSI-RS needed for a network in the first place.

* * * * *